(No Model.)
R. L. TURNER.
CULTIVATOR.
No. 261,499. Patented July 18, 1882.
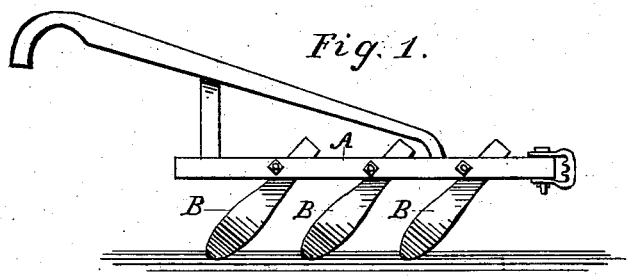
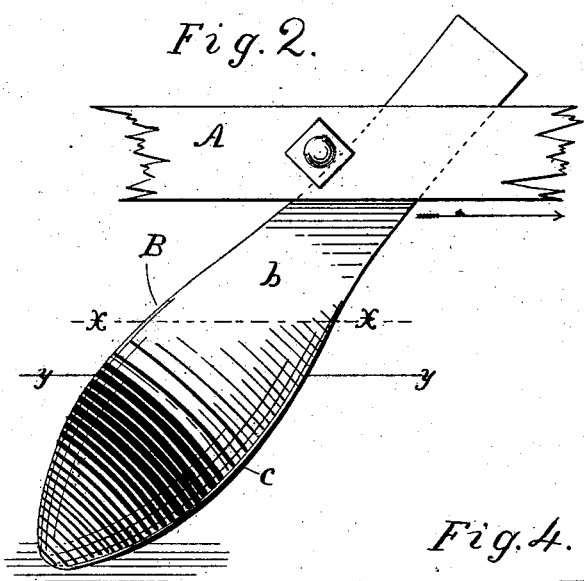
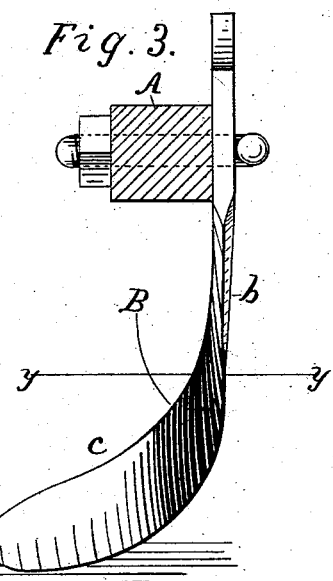
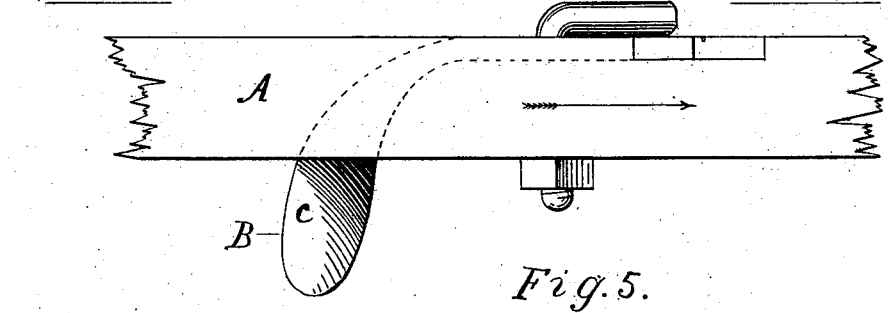
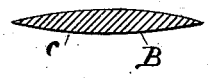
WITNESSES:
Thos. Houghton.
Edw. W. Byrn
INVENTOR:
Robt. L. Turner
BY 
ATTORNEYS.
N. PETERS, Photo-Lithographer, Washington, D. C.

UNITED STATES PATENT OFFICE.

ROBERT L. TURNER, OF OLENA, OHIO.

CULTIVATOR.

SPECIFICATION forming part of Letters Patent No. 261,499, dated July 18, 1882.

Application filed October 17, 1881. (No model.)

*To all whom it may concern:*

Be it known that I, ROBERT L. TURNER, of Olena, in the county of Huron and State of Ohio, have invented a new and Improved Cultivator; and I do hereby declare that the following is a full, clear, and exact description of the same, reference being had to the accompanying drawings, forming part of this specification, in which—

Figure 1 is a side elevation of my improved cultivator. Fig. 2 is an enlarged side view, showing the position of the tooth or blade to the frame, the surface of the ground being indicated by the line $y\ y$ and the direction of movement by the arrow. Fig. 3 is an enlarged view, looking in the line of draft or at right angles to Fig. 2. Fig. 4 is an enlarged plan view, and Fig. 5 a cross-section, of the blade through line $x\ x$.

My invention relates to an improved form of cultivator designed to secure a more perfect and uniform pulverization of the soil and an easier draft, and also to avoid displacing the soil or the leaving of the same in furrows.

It consists partly in the form of the tooth, which is made in the nature of a plain curved blade, and partly in its position in relation to the frame, the plane of the upper portion of the blade being arranged to work in the line of draft, while the body of the blade is inclined to the vertical, with its lower bent part to the rear, which structure and its relation to the frame serve the desirable result of causing the upper portion of the blade to enter the ground like a colter-blade and with a shear cut, while the offsetting curved portion scrapes, breaks, and pulverizes the soil more and more from the point where the blade first strikes the earth, and leaves the earth with a surface behind which is not broken up by furrows, as hereinafter more fully described.

In the drawings, A represents the framework of the cultivator, which may be made of wood or iron and constructed in any suitable form.

B are the cultivating-teeth, which may be of any suitable number, and held in place by hook-shaped clamp-bolts $a$, or any other suitable devices for securing the same rigidly to the frame. These teeth are formed with a shank portion, $b$, and a wider blade portion, $c$, which latter is sharp upon both edges, and the end of which is bent or curved to one side. In fixing this tooth to the frame its body portion is inclined to the vertical, with its curved lower end projecting to the rear. The plane of the upper portion of the blade is arranged in the line of the draft, and acts like a colter-blade, to first cut the soil. The combined effect of the curvature of the blade at its end, and the inclination of the body portion to the vertical, it will be seen, throws the curved portion of the blade in a position in which its plane is oblique to the line of the draft, with the front curved edge lower than the rear curved edge, and this has the effect, after the ground is opened by the draw cut of the top of the blade, to gradually pulverize the ground more and more to the rear of the blade, and as the broad side of the blade is not at right angles to the line of draft less draft is required and little or no furrow made, since the surface-soil is only traversed edgewise by the blade. The blade is made sharp upon both its edges to adapt it to either right or left position, and in curving the blade it need not be bent directly at right angles to its plane, but may be twisted a little to one side.

In making use of my invention I may not only use it for cultivating purposes, but may use it for scraping and breaking the earth in grading roads or in ditching.

I do not claim a curved cultivating-tooth broadly of itself, nor do I claim to be the first to incline a cultivator-tooth; but when a curved cultivating-blade is arranged inclinedly, as described, with the plane of its unbent portion in the line of draft, a novel mode of action takes place, as hereinbefore set forth.

Having thus described my invention, what I claim as new is—

A cultivator-tooth consisting of a two-edged blade curved at its lower end, as shown, combined with a frame-work and arranged inclinedly thereto, with the plane of its unbent portion in the line of draft, substantially as and for the purpose described.

ROBT. L. TURNER.

Witnesses:
 JOSEPH N. WATROS,
 PHINEAS W. TERRY.